United States Patent
Guigou et al.

(10) Patent No.: US 10,608,507 B2
(45) Date of Patent: Mar. 31, 2020

(54) ELECTRONICALLY SWITCHED ELECTRIC MOTOR AND CORRESPONDING AIR PULSE DEVICE

(71) Applicant: Valeo Systemes Thermiques, Le Mesnil Saint Denis (FR)

(72) Inventors: Pascal Guigou, Le Mesnil Saint-Denis (FR); Geoffroy Capoulun, Le Mesnil Saint-Denis (FR); Xavier Rousseil, Le Mesnil Saint-Denis (FR); Jonathan Fournier, Le Mesnil Saint-Denis (FR); Morgan Le Goff, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 162 days.

(21) Appl. No.: 15/574,920

(22) PCT Filed: May 23, 2016

(86) PCT No.: PCT/EP2016/061614
§ 371 (c)(1),
(2) Date: Nov. 17, 2017

(87) PCT Pub. No.: WO2016/193044
PCT Pub. Date: Dec. 8, 2016

(65) Prior Publication Data
US 2018/0166952 A1    Jun. 14, 2018

(30) Foreign Application Priority Data
May 29, 2015    (FR) ...................................... 15 54868

(51) Int. Cl.
*H02K 11/22*    (2016.01)
*H02K 1/16*    (2006.01)
(Continued)

(52) U.S. Cl.
CPC ....... *H02K 11/022* (2013.01); *B60H 1/00471* (2013.01); *H02K 1/165* (2013.01);
(Continued)

(58) Field of Classification Search
CPC .. B60H 1/00471; H02K 11/022; H02K 11/30; H02K 11/40; H02K 1/165;
(Continued)

(56) References Cited

U.S. PATENT DOCUMENTS 4,054,767 A * 10/1977 Anderson ................ H01H 9/02
200/293
4,128,364 A * 12/1978 Papst .................... F04D 25/062
310/67 R
(Continued)

FOREIGN PATENT DOCUMENTS

DE    10 2013 001339 A1    7/2014
EP    2 602 915 A2    6/2013
(Continued)

OTHER PUBLICATIONS

International Search Report of the International Searching Authority issued in PCT/EP2016/061614 dated Jul. 13, 2016 (3 pages).
(Continued)

*Primary Examiner* — Alex W Mok
(74) *Attorney, Agent, or Firm* — Osha Liang LLP

(57) ABSTRACT

An air pulse device according ding to the invention is used, in particular, in a heating, ventilation and/or air conditioning system of a motor vehicle. The air pulse device comprises a rotor (16) and a stator (14). The stator is mounted on a support means (10) that projects from a metallic plate (12) and is electrically connected to an electrical ground. A shield (60) is disposed between the rotor and the stator, which shield is also electrically connected to the electrical ground.

21 Claims, 1 Drawing Sheet

(51) Int. Cl.
| | |
|---|---|
| *H02K 1/27* | (2006.01) |
| *H02K 5/173* | (2006.01) |
| *H02K 5/22* | (2006.01) |
| *H02K 11/40* | (2016.01) |
| *H02K 11/30* | (2016.01) |
| *B60H 1/00* | (2006.01) |
| *H02K 21/22* | (2006.01) |

(52) U.S. Cl.
CPC ......... *H02K 1/2786* (2013.01); *H02K 5/1732* (2013.01); *H02K 5/1735* (2013.01); *H02K 5/225* (2013.01); *H02K 11/30* (2016.01); *H02K 11/40* (2016.01); *H02K 21/22* (2013.01); *H02K 2211/03* (2013.01)

(58) Field of Classification Search
CPC .. H02K 1/2786; H02K 21/22; H02K 2211/03; H02K 5/1732; H02K 5/1735; H02K 5/225
USPC .......................................................... 310/71
See application file for complete search history.

(56) References Cited

U.S. PATENT DOCUMENTS

| | | | | | |
|---|---|---|---|---|---|
| 4,361,953 | A | * | 12/1982 | Peachee | H02K 5/15 29/525.02 |
| 4,485,796 | A | * | 12/1984 | Boyer | F02P 7/0675 123/146.5 A |
| 4,519,010 | A | * | 5/1985 | Elsaesser | G11B 17/038 310/268 |
| 4,535,373 | A | * | 8/1985 | Schuh | G11B 17/038 360/133 |
| 4,604,665 | A | * | 8/1986 | Muller | G11B 17/038 310/67 R |
| 5,424,887 | A | * | 6/1995 | Schuh | G11B 17/038 360/97.16 |
| 5,929,611 | A | * | 7/1999 | Scott | F02B 63/04 310/184 |
| 2002/0047361 | A1 | * | 4/2002 | Naito | H02K 5/225 310/68 R |
| 2015/0333596 | A1 | * | 11/2015 | Berkouk | H05K 1/18 310/71 |

FOREIGN PATENT DOCUMENTS

| | | | |
|---|---|---|---|
| FR | 2 679 076 A1 | 1/1993 | |
| FR | 2679076 A1 * | 1/1993 | ............... H02K 5/18 |
| GB | 2 092 834 A | 8/1982 | |

OTHER PUBLICATIONS

Written Opinion of the International Searching Authority issued in PCT/EP2016/061614 dated Jul. 13, 2016 (6 pages).

\* cited by examiner

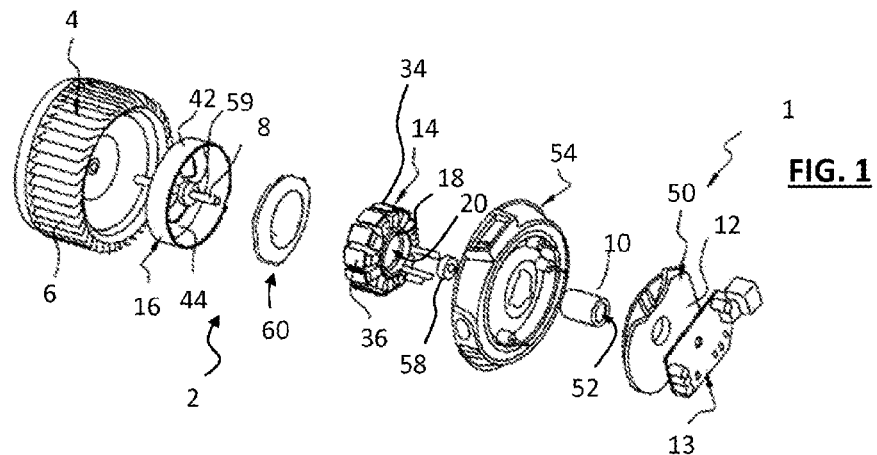
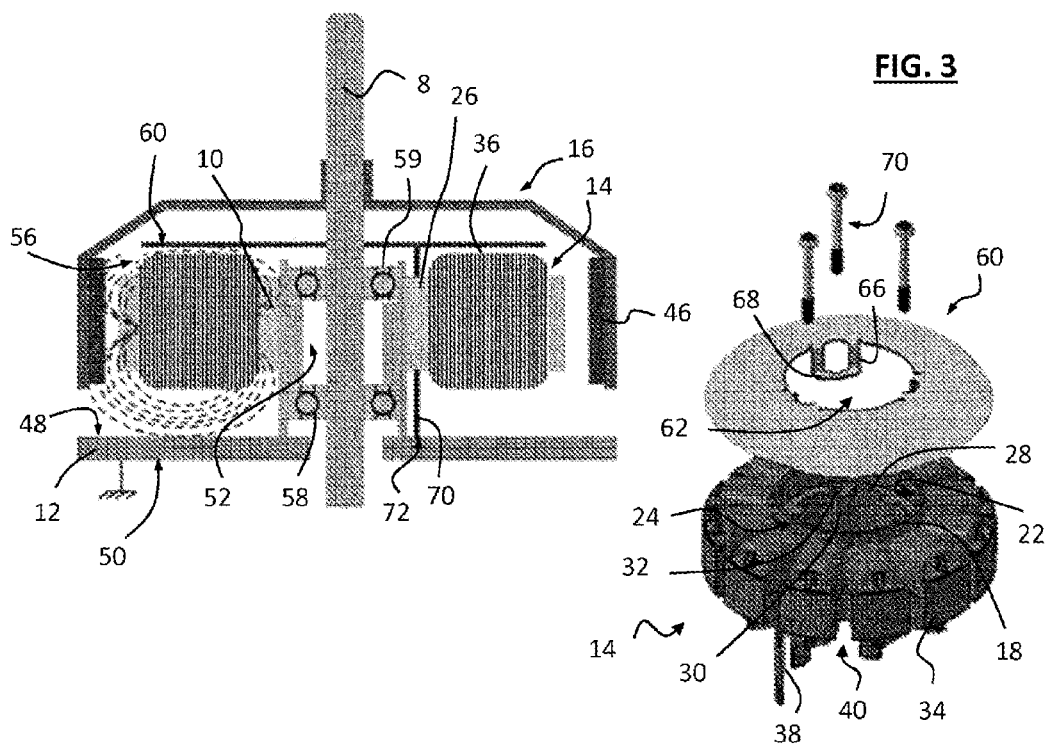

ELECTRONICALLY SWITCHED ELECTRIC MOTOR AND CORRESPONDING AIR PULSE DEVICE

The present invention relates to the field of electric motors, and in particular to that of electronically switched motors. More specifically, it relates to air pulsing devices in motor vehicles comprising such electric motors.

An air pulsing device equipped with an electric motor according to the invention is, for example, used in a ventilation, heating and/or air conditioning system of a motor vehicle.

The electronically switched electric motors, or brushless direct current motors, comprise a rotor and stator assembly, each of these components bearing electromagnetic elements whose interaction generates the movement of the rotor in relation to the stator. The rotor and the stator are mounted independently of one another in said motor, and it is important to ensure that the relative positioning of these two components is correct for optimal operation of the motor. Moreover, the current switching in the coils of the stator generates electrical fields which can disturb the operation of other electronic devices positioned in proximity.

The present invention falls within this context and its aim is to propose an electric motor and an associated air pulsing device which make it possible in particular to contain at least a part of the electromagnetic radiations generated in the electric motor.

An air pulsing device should be understood to be a device that makes it possible to suck and/or blow air.

The air pulsing device according to the invention is of the type comprising a fan wheel driven in rotation by an output shaft of an electronically switched electric motor, with the motor consisting of at least one rotor secured in rotation to the output shaft and suitable for rotating about a stator, which is mounted on a support means arranged protruding from a plate, which is positioned on a side of the stator, opposite the side where said rotor extends.

The stator has an annular form with a central a which delimits the outline of an internal bore through which passes said output shaft, and it also comprises a plurality of teeth arranged radially in star configuration from the external face of said central wall and each bearing a magnetic coil generating an electromagnetic field. In particular, provision is made for said teeth to have, at their distal end, opposite the central wall, metal sheets which extend substantially parallel to the axis of the output shaft, and each metal sheet is advantageously arranged so that a zone of passage for the winding of the coil is formed between two neighboring metal sheets.

The rotor, arranged around the stator, bears at least one permanent magnet whose interaction with said current-powered coils generates a rotational movement of the rotor about the stator.

According to the invention, provision is made for a shield to be positioned, transversely to the output shaft, between the rotor and the stator, said shield being linked electrically to the plate which is connected electrically to the electrical ground.

This arrangement allows the formation of a conductive enclosure linked to the electrical ground, and therefore maintained at a fixed potential, so as to form a shielding capable of containing, within the air pulsing device, the electrical field created by the current switching in the coils of the stator generates electrical fields.

According to a first series of features, taken alone or in combination, specific to the electrical connection of the stator onto the support means, it will be possible to provide for the shield to be connected electrically to the plate by means passing axially through the stator, in particular in the central wall thereof, and for the shield to extend radially over all the diameter of the stator;

the shield to have a substantially flat annular form, pierced at its center by a bore to be passed through by the motor output shaft;

the shield to be fixed onto the stator, by at least one fixing screw capable of cooperating with a hole formed in the stator;

the internal bore of the stator to have two distinct parts through modification of the internal diameter of the central wall delimiting said internal bore, a first part of larger diameter extending from the edge positioned axially in the vicinity of the shield to a shoulder edge delimiting a second part of smaller diameter, said hole cooperating with the fixing screw being formed in the shoulder edge;

the shield to comprise at least one tab which prolongs, substantially at right angles, the edge delimiting the central bore of the shield, and whose free end has a bearing edge, such that the tab comes into contact with the shoulder edge by this bearing edge when the shield is in the position covering the stator;

the bearing edge to be arranged to allow passage of the body of the fixing screw into the fixing hole and be pressed against the shoulder edge by the screw head;

three fixing holes to be evenly distributed at 120° over the perimeter of the central wall delimiting the internal bore of the stator;

the shield to be connected to the electrical ground via said at least one fixing screw which extends substantially parallel to the motor output shaft, by passing through said stator to engage on said plate;

the stator to have at least one axial boss positioned protruding from the internal face of the central wall defining the internal bore of said stator, said boss being pierced axially by the fixing hole capable of being passed through by the at least one fixing screw;

the shield to be produced in an electrically conductive material, for example aluminum;

the output shaft of said motor to be mounted to rotate inside the sleeve via rolling bearings;

the plate to form a heat sink bearing a control electronic circuit board, in particular for powering the coils of the stator, the control electronic circuit board then being positioned on the face of the plate oriented opposite the sleeve.

The present invention relates also to a heating, ventilation and/or aft conditioning system of a motor vehicle comprising at least one air pulsing device according to what has just been described previously.

Other features and advantages of the invention will become apparent from reading the following detailed description of an embodiment, and for an understanding of which reference will be made to the attached drawings in which:

FIG. 1 is a perspective exploded representation of an air pulsing device according to the invention;

FIG. 2 schematically illustrates an air pulsing device comprising, according to the invention, axial containment means for the electromagnetic radiations; and FIG. 3 is a perspective view of a stator and of axial containment means for the electromagnetic radiations with which an electric motor is equipped in an air pulsing device according to FIG. 2.

An air pulsing device 1, which makes it possible to suck in and/or blow out aft, comprises at least one electronically switched electric motor 2, capable of rotationally driving a fan wheel 4, of the type here with fins 6, via an output shaft 8 of the electric motor. The device also comprises at least one support means 10 for the electric motor 2, and a plate 12 onto which is fixed said support means 10 and a control electronic circuit board 13 of said electric motor 2, and which forms a means for cooling the components of said device.

The electric motor 2 mainly comprises a stator 14 and a rotor 16, bearing the output shaft 8 capable of driving the fan wheel 4. The stator 14 is secured to the support means 10, and the rotor 16 is arranged around the stator 14 to be driven in rotation under the effect of the magnetic fields generated by the winding and the magnets associated with the rotor and the stator.

As can be seen in FIG. 3, the stator 14 has an annular form with a central wall 18 which delimits the outline of an internal bore 20. The central wall 18 has an internal face 22 turned toward the internal bore 20 and an external face 24 prolonged by a plurality of teeth 26 arranged radially in star configuration.

The internal bore 20 of the stator 14 has distinct parts through modification of the internal diameter of the central wall 18 delimiting said internal bore 20, parts of larger diameter extending from the edges of axial ends of the central wall to a shoulder edge 28 delimiting a central part of the internal bore 20 of smaller diameter. In this central part, the stator 14 has at least one axial boss 30 positioned protruding from the internal face, said boss being pierced axially by a fixing hole 32 as described hereinbelow.

The teeth 26 are formed by a straight wall, of which a proximal radial end is secured to the central wall 18 of the stator 14 and of which a free distal radial end is prolonged by a sheet 34 which extends over all the height of the stator 14 and which is wider than the straight wall, in order to form an abutment wall for the winding made to be spooled around the straight wall of the teeth 26. Each sheet 34 is covered opposite the straight wall by a superpositioning of different layers of sheet metal, glued to one another.

The stator 14 comprises an excitation winding composed of several phases, each comprising at least one wire winding 36, the outputs of which are connected electrically to power supply means not represented here (only the connection means 38 being visible in FIG. 3).

In a particular embodiment, the stator comprises twelve teeth wound in three-phase configuration. The wire winding is produced around the teeth, each tooth bearing a winding element. As illustrated, the sheets 34 borne at the end of the teeth and the metal layers which are glued thereto are dimensioned to provide a zone of passage 40 between them that can allow the space necessary to perform the winding of the wire around the teeth.

The rotor 16 is bell-shaped, with an annular crown ring 42 and a closure wall 44 positioned at an end of said crown ring. The closure wall can have a flat form substantially at right angles to the axis of the crown ring or else an incurved form a clear distance from the crown ring, and it bears, at its center, the motor output shaft 8.

The crown ring 42 has a diameter greater than the external diameter of the stator, such that the rotor can cover the stator. The crown ring has an internal face which is turned toward the stator in this covering position, and at least one permanent magnet 46 is positioned on this internal face of the crown ring of the rotor.

When the motor is assembled, the stator 14 is positioned in the body of the rotor 16 delimited by the crown ring 42. The rotor and the stator are thus arranged for the permanent magnet 46 borne by the rotor 16 to be constantly positioned in the magnetic field generated by the coils of the stator 14 when the latter are supplied with current, so as to generate a rotational movement of the rotor about the stator.

In the air pulsing device 1 comprising the electric motor 2 according to the invention, the stator 14 and the rotor 16 are arranged such that the closure wall 44 of the rotor is turned toward the fan wheel 4 and the stator 14 is positioned facing the plate 12.

The support means 10 is fixed onto a first face 48 of the plate 12, whereas the electronic circuit board 13 is fixed onto a second face 50 opposite this plate. It will be understood that, in this way, when the components of the device are mounted, the electronic circuit board is turned away from the electric motor. The plate is fixed mechanically relative to the structure of the vehicle, here via a frame 54 illustrated in FIG. 1, and it is connected electrically to the ground of the electronic member. In FIG. 1, the plate 12 has a disk form but it will be understood that the latter can take other forms, for example rectangular, square, elliptical, etc.

The plate 12 extends in a plane substantially at right angles to the axis of revolution of the internal channel of the support means 10. The support means, substantially cylindrical, has an internal channel 52 emerging substantially at the center of the plate. In FIG. 2, it will be understood that the support means is capable of being housed in the internal bore 20 of the stator 14 and of receiving the motor output shaft 8 secured to the rotor 16, so that this support means 10 ensures the correct positioning of the rotor 16 relative to the stator 14. The support means can be fixed onto the plate by different means and in particular welding means.

Preferentially, the plate 12 is made of metal. Thus, the plate serving as heat sink can effectively cool the electronic member by thermal conduction. Furthermore, the fact that the plate is produced in materials with high electrical conductivity and that it is linked to the ground of the electronic member makes it possible to block electromagnetic radiations emitted by the electronic member, these radiations being able to disturb the operation of the electric motor. Preferentially, the plate is made of aluminum, such that the characteristics of lightness and of good thermal conduction are associated for these parts.

As can be seen in particular in FIG. 2, the stator 14 is fixed onto the support means 10 and the rotor 16 is arranged to rotate about the stator 14. In particular, the stator is positioned around the support means, by being in contact with the external face of the sleeve that said support means 10 forms, while the rotor 16 is received, via the output shaft 8 to which it is secured, in the internal channel 52 of the support means 10. The electrical power supply of the coil wires creates magnetic fields 56, illustrated by way of example for a winding around a tooth in FIG. 2, which forces the rotation of the rotor driven under the effect of the permanent magnet 46 that it bears. The result thereof is a driving of the output shaft 8 of the motor which, as illustrated, is borne by the rotor 16 and which is mounted to rotate inside the internal channel 52 of the support means 10 via rolling bearings.

Two rolling bearings 58, 59 are inserted into the internal channel 52 of the support means 10 to serve as rotation guide for the output shaft 8 of the motor driven otherwise in rotation by the rotor 16. These rolling bearings can be ball bearings, as schematically illustrated, but it will be understood that they could take the form of roller, needle or other such bearings.

The fan wheel 4 of the air pulsing device 1 is secured to the free end of the output shaft 8 of the motor which extends opposite the stator 14 and the plate 12, and it comprises, positioned at its periphery, a plurality of fins 6. The rotation of the rotor rotationally drives the wheel which contributes to producing the pulsed air via the fins.

It is particularly noteworthy according to the invention that the electric motor 2 formed by the rotor 16 and the stator 14 also comprises containment means for avoiding the propagation of the electromagnetic radiations outside of the motor and of the air pulsing device.

In particular, the motor comprises axial containment means, that is to say means making it possible to avoid the propagation, along the axis of the output shaft of the motor, of these electromagnetic radiations.

There now follows a description of a particular embodiment in that the axial containment means consist of the presence of an additional shield positioned between the rotor and the stator, this shield being produced in a material with strong conductivity, in particular aluminum, and linked electrically to the ground.

In FIG. 2, the motor 2 comprises a shield 60, positioned transversely to the output shaft 8, between the stator 14 and the rotor 16, to form axial containment means for the electromagnetic radiations. In order to form an effective containment means, the shield 60 extends transversely over all the diameter of the stator.

As illustrated in FIG. 3, provision can be made for the shield 60 to have a substantially flat annular form, pierced at its center by a bore 62 to be passed through by the output shaft of the motor which extends between the rotor and the stator.

The shield 60 is fixed onto the stator 14 substantially at the center of the shield. And the fixing means provided, by screwing, also allow this shield 60 to be connected to the ground. To this end, the shield 60 comprises at least one tab 66 which prolongs, substantially at right angles, the edge delimiting the central bore 62 of the shield. The free end of this tab has a bearing edge 68 folded back at right angles to the rest of the tab, to come into contact with the stator and more particularly with the shoulder edge 28 of the internal bore 20 of the stator 14, when the shield 60 is in the position covering this stator 14. The shield is arranged angularly for the bearing edge 68 of this tab to be arranged around a fixing hole 32 produced in the thickness of the stator.

The bearing edge 68 is arranged to allow passage of the body of a fixing screw 70, which extends substantially parallel to the motor output shaft, for the insertion of this screw into the corresponding fixing hole 32, and to be pressed against the shoulder edge 28 by the screw head.

As illustrated, the shield 60 comprises three fixing tabs 66, evenly distributed at 120° over the perimeter of the central bore of the shield, and as many fixing holes 32 are provided for the shield to be pressed against the stator by three fixing screws 70.

Advantageously, provision is made to use the fixing screws 70 for the grounding of the shield 60, this grounding being necessary for the shield to form part of an electrical field shielding capable of containing the electromagnetic radiations.

As schematically illustrated in FIG. 2, the shield 60 is grounded via at least one of the fixing screws 70, which to this end passes through the stator 14 to engage on the other side of the stator, on the plate 12. This fixing screw 70 passes through a smooth fixing hole produced through the stator 14 and it engages in a tapped hole 72 produced in the ground body. It will be understood that each of the three fixing screws can have such an arrangement, or else that only one of the fixing screws 70 passes through the stator 14 to engage on the plate 12, the other two fixing screws being shorter so as to cooperate with a tapped fixing hole 32 in the body of the stator. The electrical connection of the shield and its grounding is done via the metal plate 12, the at least one metal fixing screw 70 engaged in the plate, and the contact between the tab 66 of the shield and the screw head.

The above description aims to explain how the invention makes it possible to achieve the objectives set for it and in particular propose an air pulsing device which contains the electromagnetic radiations, by the creation of containment means that are simple to manufacture, simple to mount and particularly effective. However, the invention is not limited to just the air pulsing devices conforming to the embodiments explicitly described in light of FIGS. 1 to 3, it being understood that variant embodiments could be put in place without departing from the context of the invention, provided that an axial containment of the electromagnetic radiations is made possible by the grounding of a metal shield positioned between the rotor and the stator of an electric motor, in particular an electronically switched motor.

The invention claimed is:

1. An air pulsing device comprising:
   an electronically switched electric motor, said motor comprising a rotor and a stator mounted on a support means arranged protruding from a plate,
   wherein a shield is positioned between the stator and the rotor, said shield being linked electrically to the plate which is connected electrically to an electrical ground.

2. The air pulsing device as claimed in claim 1, wherein said plate is positioned on a side of the stator opposite the side of said rotor.

3. The air pulsing device as claimed in claim 1, wherein the shield is connected electrically to the plate by means passing axially through the stator.

4. The air pulsing device as claimed in claim 1, wherein said shield extends radially over all the diameter of the stator.

5. The air pulsing device as claimed in claim 1, wherein said shield has a substantially flat annular form.

6. The air pulsing device as claimed in claim 1, wherein the shield is pierced at its center by a bore to be passed through by an output shaft of the motor.

7. The air pulsing device as claimed in claim 6, wherein said stator has an annular form with a central wall which delimits the outline of an internal bore through which passes said output shaft.

8. The air pulsing device as claimed in claim 7, wherein said stator further comprises a plurality of teeth arranged radially in star configuration from the external face of said central wall and each bearing a magnetic coil generating an electromagnetic field.

9. The air pulsing device as claimed in claim 8, wherein said rotor, arranged around the stator, bears at least one permanent magnet whose interaction with said current-powered coils generates a rotational movement of the rotor about the stator.

10. The air pulsing device as claimed in claim 7, wherein said shield is fixed onto the stator, by at least one fixing screw capable of cooperating with a hole formed in the stator.

11. The air pulsing device as claimed in claim 10, wherein the shield is connected to the electrical ground via said at least one fixing screw which extends by passing through said stator to engage on said plate.

12. The air pulsing device as claimed in claim 10, wherein the stator has at least one axial boss positioned protruding from the internal face of the central wall defining the internal bore of said stator, said boss being pierced axially by the fixing hole capable of being passed through by the at least one fixing screw.

13. The air pulsing device as claimed in claim 7, wherein the internal bore of the stator has two distinct parts through modification of the internal diameter of the central wall delimiting said internal bore, a first part of larger diameter extending from the edge positioned axially in the vicinity of the shield to a shoulder edge delimiting a second part of smaller diameter, a hole cooperating with a fixing screw being formed in the shoulder edge.

14. The air pulsing device as claimed in claim 13, wherein the shield comprises at least one tab which prolongs, substantially at right angles, the edge delimiting the central bore of the shield, and whose free end has a bearing edge, such that the tab comes into contact with the shoulder edge by this bearing edge when the shield is in the position covering the stator.

15. The air pulsing device as claimed in claim 14, wherein the bearing edge is arranged to allow the passage of body of the fixing screw into the fixing hole and be pressed against the shoulder edge by the screw head.

16. The air pulsing device as claimed in claim 7, wherein the output shaft of said motor is mounted to rotate inside an internal channel of the support means via rolling bearings.

17. The air pulsing device as claimed in claim 1, wherein the shield is produced in an electrically conductive material.

18. The air pulsing device as claimed in claim 1, wherein the plate forms a heat sink bearing a control electronic circuit board for powering the coils of the stator.

19. The air pulsing device as claimed in claim 18, wherein the control electronic circuit board is positioned on the face of the plate oriented opposite the support means.

20. The air pulsing device as claimed in claim 18, wherein the plate is connected electrically to the electrical ground of the control electronic circuit board.

21. A heating, ventilation and/or air conditioning system of a motor vehicle comprising:
  at least one air pulsing device including an electronically switched electric motor,
  said electric motor comprising a rotor and a stator mounted on a support means arranged protruding from a plate,
  wherein a shield is positioned between the stator and the rotor, said shield being linked electrically to the plate which is connected electrically to an electrical ground.

* * * * *